United States Patent
Jackson

(10) Patent No.: US 7,333,271 B2
(45) Date of Patent: Feb. 19, 2008

(54) DICHROIC MANGIN MIRROR

(75) Inventor: John E. Jackson, Carol Stream, IL (US)

(73) Assignee: Northrop Grumman Corporation, Los Angeles, CA (US)

(*) Notice: Subject to any disclaimer, the term of this patent is extended or adjusted under 35 U.S.C. 154(b) by 148 days.

(21) Appl. No.: 11/174,914

(22) Filed: Jul. 5, 2005

(65) Prior Publication Data

US 2007/0008614 A1    Jan. 11, 2007

(51) Int. Cl.
  *G02B 27/14* (2006.01)
  *G02B 17/00* (2006.01)
(52) U.S. Cl. .................. 359/634; 359/365; 359/399; 250/226
(58) Field of Classification Search ........ 359/350–367, 359/580–590, 618–637, 725–732, 399
See application file for complete search history.

(56) References Cited

U.S. PATENT DOCUMENTS

| | | | | |
|---|---|---|---|---|
| 4,746,798 A | * | 5/1988 | Amon et al. ............ | 250/339.02 |
| 4,870,268 A | * | 9/1989 | Vincent et al. ............ | 250/226 |
| 5,114,238 A | * | 5/1992 | Sigler ........................ | 359/399 |
| 5,205,044 A | * | 4/1993 | DePaoli ..................... | 42/132 |
| 6,147,806 A | * | 11/2000 | Park et al. ................. | 359/634 |
| 7,082,001 B2 | * | 7/2006 | Vizgaitis .................... | 359/729 |

FOREIGN PATENT DOCUMENTS

JP    3-95504    * 4/2001

* cited by examiner

*Primary Examiner*—Thong Q. Nguyen
(74) *Attorney, Agent, or Firm*—Stetina Brunda Garred & Brucker

(57) ABSTRACT

An optical system having at least one dichroic Mangin mirror. The optical system has a front-end optical subsystem or a light source operative to emit an optical beam. The optical beam is dispersed into at least a first color beam and a second color beam and has certain degree of monochromatic aberration. The dichroic Mangin mirror is disposed along the optical paths of both the first and second color beams. The dichroic Mangin mirror includes a first surface operative to transmit the first color beam only, but reflects the second color beam. Therefore, upon incident on the dichroic Mangin mirror, the second color beam is reflected, while the first color beam transmits through the first surface and is then reflected off from the second surface. Thereby, the first and second color beams can be focused at the same position, which is referred as an achromatic system focus. Thereby, the chromatic aberration caused by the dispersion can be eliminated.

10 Claims, 2 Drawing Sheets

DICHROIC MANGIN MIRROR

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates in general to a device for correcting chromatic and other types of aberration, and more particularly, to a dichroic Mangin mirror operative to achromatize a large spectrum and correct aberration.

When a light beam composed of multiple wavelengths propagates through a medium, the index of refraction is wavelength dependent. The wavelength dependence is known as dispersion. A well-known dispersion example is a glass prism that disperses an incident beam of white light into a rainbow color. Many optical devices or elements, such as photographic lenses that comprise various dispersive, dielectric glasses, do not refract all constituent wavelengths of an incident light beam at the same angle. This causes the departure of a perfect imaging for a multi-wavelength light beam. For a color light beam, the departure of perfect imaging due to dispersion is referred as a chromatic aberration. Two types of chromatic aberration are commonly seen, including the longitudinal and transverse chromatic aberration. The longitudinal chromatic aberration is the inability of a lens to focus different colors at the same focal point. For example, as shown in FIG. 1, for a subject point on the optical axis the foci of the various colors are also on the optical axis, but displaced in the longitudinal direction (i.e. along the axis). The transverse chromatic aberration, also referred as lateral color, often occurs when the light beam is obliquely incident on the lens as shown in FIG. 2.

In addition to the chromatic aberration, monochromatic aberration, including spherical aberration, coma, oblique astigmatism, curvature of field, and distortion also affect imaging of an incident light beam. Many optical designs, including lens doublets or triplets composed of lenses with compensation characteristics, have been used to eliminate the aberration. However, most of these optical designs, though effective to resolve one of the aberrations, will inevitably cause other adverse optical effects or the design may be ineffective for removing more than one aberration.

BRIEF SUMMARY

An optical system which uses at least one dichroic Mangin mirror is provided. The optical system includes a front-end optical sub-system or a light source operative to emit an optical beam. The optical beam is dispersed into at least a first color beam and a second color beam and has a certain degree of monochromatic aberration. The dichroic Mangin mirror is disposed along the optical paths of both the first and second color beams. The dichroic Mangin mirror includes a first surface operative to transmit the first color beam only, but reflects the second color beam. Therefore, upon incident on the dichroic Mangin mirror, the second color beam is reflected, while the first color beam transmits through the first surface and is then reflected off a second surface. Thereby, the first and second color beams can be focused at the same position, which is referred as an achromatic system focus. Thereby, the chromatic aberration caused by the dispersion can be eliminated.

Preferably, the geometry of the first and second surfaces can be adjusted and selected in accordance with the specific aberration that the optical beam bears, for example, spherical aberration and comatic aberration (coma). For example, the net power of the first and second surfaces may be adjusted to zero. The partial transparency for the optical beam allows the monochromatic aberration to be corrected without causing severe chromatic aberration.

In one embodiment, the first surface includes a dichroic lens, and the second surface includes a reflection mirror adjacent to the dichroic lens, such that the first and second color beams can be adjusted or oriented independently by adjusting the individual first and second surfaces. Alternatively, the second surface may include a reflection layer coated on one surface of the dichroic lens.

The optical system may include a second Mangin mirror having substantially the same structure of the first Mangin mirror. The second Mangin mirror is located along an optical path of the first and second color beams emerging from the first Mangin mirror. As discussed above, when the first and second surfaces of the first and second Mangin mirrors are independently adjustable, the first and second color beams can thus be adjusted and corrected independently without affecting the adjustment of each other. It will be appreciated that, according to specific requirements, the optical system may include more than two Mangin mirrors.

An achromatic corrector is also provided to correct an optical beam dispersed into at least a first range and a second range of wavelengths. The optical beam may also contain certain degree of monochromatic aberration. The achromatic corrector includes a pair of Mangin mirrors each comprising a dichroic first surface and a mirrored second surface. Preferably, the dichroic first surface includes a lens fabricated from dichroic material, while the mirrored second surface includes a mirror located adjacent to the lens or a reflection coating attached to one surface of the lens. Preferably, the first and second Mangin mirrors are arranged with the first dichroic surfaces facing each other, such that the first wavelength range of the optical beam propagating between the second surfaces, while the second wavelength range of the optical beam propagating between the first surfaces can be adjusted to focus at the same position.

A dichroic Mangin mirror is further provided. The dichroic Mangin mirror includes a first lens portion operative to transmit a first wavelength range of the optical beam and reflect a second wavelength range of the optical beam, and a mirror portion located along an optical path of the first wavelength range of the optical beam transmitting through the first lens portion, so as to reflect the first wavelength range of the optical beam therefrom. The first lens portion includes a diochroic lens, while mirror portion includes either an independently adjustable or a reflection layer coated on one surface of the lens portion.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Mirrors are widely used in telescopes and telephoto lenses for having the advantage of operating over a wider range of wavelengths, from infrared to ultraviolet and above and ability to avoid chromatic aberration arising from dispersion in lenses. However, mirrors are still subject to other aberrations. Instruments which use only mirrors to form images are called catoptric systems, while those which use both lenses and mirrors are called catadioptric systems (dioptric systems being those with lenses only). The fundamental philosophy behind most catadioptric systems is to use refracting elements to correct the aberrations of a system of spherical mirrors without introducing any new aberrations. An ordinary Mangin mirror is typically a meniscus negative lens having a reflection coating formed on a second surface thereof to provide the effect of a lens plus a mirror. The Mangin mirror has been used to correct spherical aberration and also has a reduced coma contribution, but it is afflicted with severe chromatic aberration.

To correct the monochromatic aberration such as the spherical aberration and coma as well as the chromatic aberration, a dichroic Mangin mirror including a partially transparent first surface and a mirrored second surface is provided to replace the conventional Mangin mirror of which the first surface is transparent to the incident optical beam. The first surface of the Mangin mirror is preferably made of dichroic material that reflects a range of wavelengths and transmits another other range of wavelength. For example, when the first surface is in the form of a meniscus negative lens made of dichroic crystal, the incident beam having the wavelength $\lambda$ larger than a critical or cutoff wavelength $\lambda_0$ is allow to transmit through, while the incident beam having the wavelength $\lambda$ smaller than the cutoff wavelength $\lambda_0$ will be reflected off from the first surface of the Mangin mirror. For example, when a light beam dispersed into a red color beam and a blue color beam is incident on the Mangin mirror of which the cutoff wavelength $\lambda_0$ is between the red color and the blue color, the red color beam larger than the cutoff wavelength $\lambda_0$ is allowed to transmit through the lens portion of the Mangin mirror, while the blue color beam is reflected off from the first surface, that is, the lens portion of the Mangin mirrors. After transmitting through the lens portion of the Mangin mirror, the red color beam is reflected off from the second mirrored surface. The reflected red color beam is then operative to transmit through and emerge from the lens portion of the Mangin mirror.

Figure 1:
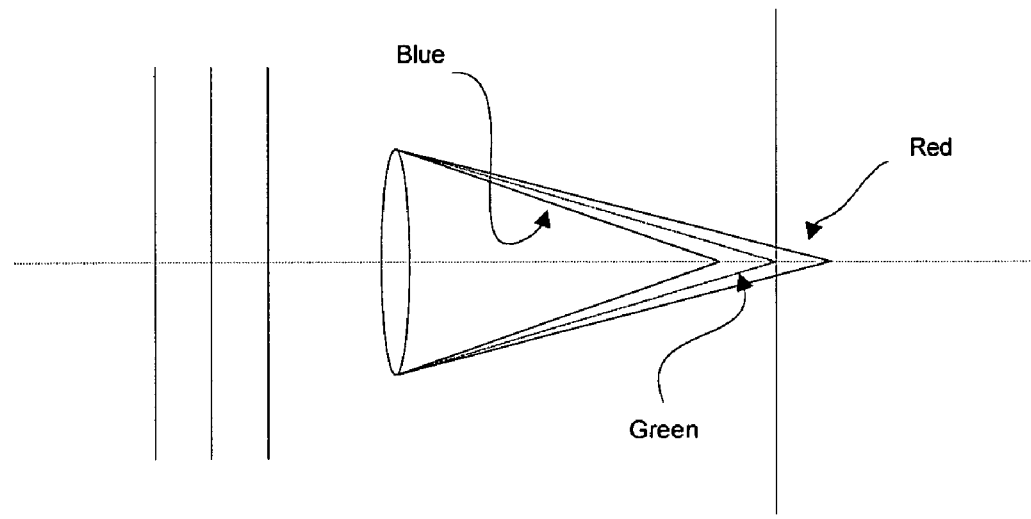
FIG. 1 illustrates the phenomenon of a longitudinal chromatic aberration.
Figure 2:
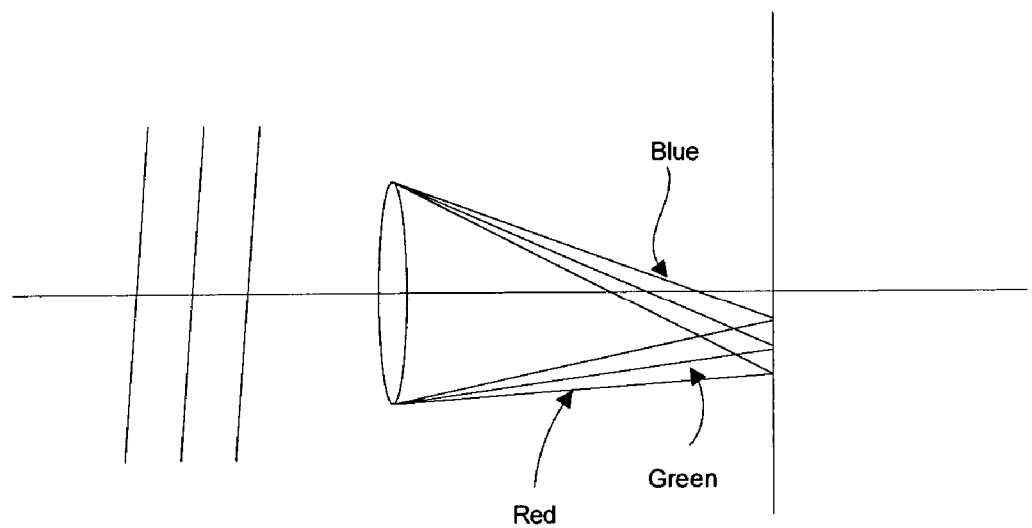
FIG. 2 illustrates the phenomenon of a transverse chromatic aberration.
Figure 3:
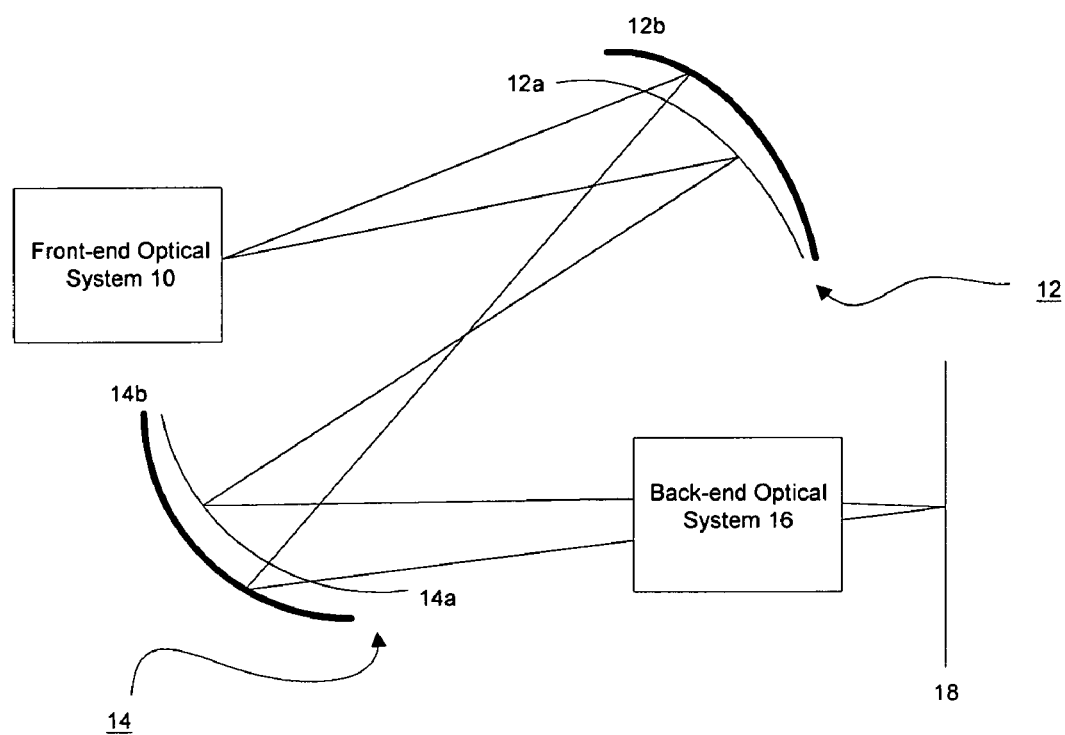
FIG. 3 illustrates a diochroic Mangin for correcting chromatic and other aberration introduced by an optical system.

FIG. 3 illustrates an optical system that uses the dichroic Mangin mirror to correct both chromatic and monochromatic aberration. As shown, the optical system includes a front-end optical subsystem 10 which emits an optical beam that has certain degree of chromatic and monochromatic aberration. The optical beam emitted from the front-end optical subsystem 10 is then incident on a first Mangin mirror 12. As discussed above, the Mangin mirror 12 includes a dichroic lens portion 12a which transmits a first wavelength range of the incident beam and reflects a second wavelength range of the incident beam and a mirror portion 12b which reflects all incoming or incident beam. The first wavelength range of the incident beam, after transmitting through the lens portion 12a, is reflected off the mirror portion 12b. Again, as the lens portion is transparent to the first wavelength range, the first wavelength range can thus transmit through the lens portion 12a again and emerge from the first Mangin mirror 12. In this manner, the optical paths of the first wavelength and the second wavelength can be adjusted and oriented independently. More specifically, the lens portion 12a can be adjusted and oriented to control the optical path of the second wavelength range, and the mirror portion 12b can be adjusted independently without affecting the propagating of the second-wavelength range reflected off from the lens portion 12a.

In the embodiment as shown in FIG. 3, the optical system further comprises a second Mangin mirror 14 having substantially the same structure of the first Mangin mirror 12. That is, the second Mangin mirror 14 includes a lens portion 14a operative to transmit the first wavelength range of an incident beam and reflect the second wavelength range of the incident beam, and a mirror portion 14b to reflect off all light incident thereon. Therefore, the first wavelength range emerging from the first Mangin mirror 12 is operative to transmit through the lens portion 14a to impinge on the mirror portion 14b. Being reflected off from the mirror portion 14b, the first wavelength range then transmits through and emerges from the lens portion 14a of the second Mangin mirror 14. The second wavelength range reflected off the lens portion 12a of the first Mangin mirror 12, upon incident on the second Mangin mirror 14, is reflected off the lens portion 14a thereof. Thus designed, the pair of lens portions 12a and 14a is used to control the optical path of the second wavelength range dispersed from the incident beam, while the pair of mirror portions 12b and 14b can be independently adjusted to control the optical path of the first wavelength range of the incident beam. By properly adjust the orientations and positions of the lens portions 12a, 14a and the mirror portions 12b and 14b, the first and second wavelength ranges can be focused at the same position as shown in FIG. 3. Thereby, the chromatic aberration can be corrected.

In addition to the chromatic aberration, for each individual wavelength range, the pair of optical elements, that is, the pair of lens portions 12a and 14a and/or the pair of mirror portions 12b and 14b can be configured and arranged to resolve specific optical phenomenon such as monochromatic aberration occurring to individual wavelengths. In this aspect, in addition to the combination of the concave meniscus lens portion and the concave mirror portion as shown in FIG. 3, the lens portion and the mirror portion of the Mangin mirrors 12 and 14 can be modified into various geometries for matching specific optical effect. Alternatively, the lens portion and the mirror portion of the Mangin mirrors 12 and 14 can be formed of an integral piece of lens with a second surface coated with a mirror layer.

Further referring to FIG. 3, the optical system may further comprises a back-end optical system 16 located along the optical paths of the first and second wavelength ranges of optical beams emerging from the second Mangin mirror 14. The back-end optical subsystem 16 is used to correct axial defocus problem. At the focal point 18 of the first and second wavelength ranges, a screen, a detector or a focal plane detector array may be disposed for collecting the corrected optical beam.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An achromatic corrector, comprising a pair of Mangin mirrors each comprising:
   a partially transparent first surface operative to transmit a first wavelength range of an optical beam and reflect a second wavelength range of the optical beam and
   a mirrored second surface located along an optical path of the first wavelength range transmitting through the first surface, the second surface operative to reflect the first wavelength range of the optical beam,
   wherein the pair of Mangin mirrors are arranged with the first surfaces facing each other such that the first surfaces are adjustable to direct the second wavelength range and the second surfaces are adjustable to direct the first wavelength range.

2. The achromatic corrector of claim 1, wherein the first surface includes a lens fabricated from dichroic material.

3. The achromatic corrector of claim 2, wherein the mirrored second surface includes a mirror located adjacent to the lens.

4. The achromatic corrector of claim 2, wherein the mirrored second surface includes a reflection layer coated on the lens.

5. The achromatic corrector of claim 1, wherein the first and second surfaces of each mirror are independently adjustable.

6. A Mangin mirror operative to correct both chromatic and monochromatic aberrations of an incident optical beam, comprising:
   a partially transparent lens portion operative to transmit a first wavelength range of the optical beam and reflect a second wavelength range of the optical beam; and
   a mirror portion located along an optical path of the first wavelength range of the optical beam transmitting through the lens portion, so as to reflect the first wavelength range of the optical beam therefrom,
   wherein the lens portion is adjustable to direct the second wavelength range and the mirror portion is adjustable to direct the first wavelength range.

7. The Mangin mirror of claim 6, wherein the lens portion includes a diochroic lens.

8. The Mangin mirror of claim 6, wherein the mirror portion includes an independently adjustable mirror.

9. The Mangin mirror of claim 6, wherein the mirror portion includes a reflection layer coated on one surface of the lens portion.

10. The Mangin mirror of claim 6, wherein the lens portion and the mirror portion are independently adjustable.

* * * * *